United States Patent [19]

Tucker

[11] Patent Number: 4,823,502
[45] Date of Patent: Apr. 25, 1989

[54] FISHING LURE

[76] Inventor: Michael A. Tucker, 1777 Cody St., Lakewood, Colo. 80215

[21] Appl. No.: 160,399

[22] Filed: Feb. 25, 1988

[51] Int. Cl.⁴ ............................................. A01K 85/00
[52] U.S. Cl. .................. 43/42.37; 43/42.39; 43/42.33
[58] Field of Search ................. 43/42.33, 42.35, 42.37, 43/42.98, 42.99, 42.39

[56] References Cited

U.S. PATENT DOCUMENTS

| | | | |
|---|---|---|---|
| 2,093,585 | 9/1937 | Woodhead et al | 43/42.25 |
| 2,216,688 | 10/1940 | Harvey | 43/42.35 |
| 2,938,294 | 5/1960 | Bachmann | 43/42.35 |
| 3,063,189 | 11/1962 | Keller | 43/44.98 |
| 3,133,371 | 5/1964 | Christensen | 43/42.35 |
| 3,808,725 | 5/1974 | Matsumoto et al. | 43/44.98 |
| 3,914,480 | 10/1975 | Lang | 43/44.98 |
| 3,953,934 | 5/1976 | Visser | 43/44.99 |
| 4,215,506 | 8/1980 | LeBoeuf | 43/42.33 |
| 4,606,144 | 8/1986 | Sasaki et al. | 43/44.98 |
| 4,709,499 | 12/1987 | Ottaviano | 43/44.99 |

Primary Examiner—M. Jordan
Attorney, Agent, or Firm—Timothy J. Martin; J. Preston Oxenham

[57] ABSTRACT

An artificial fishing lure such as a fly is provided with ballast material. The fly includes a fish hook having a hook portion, a shank portion and an eye portion. The shank is encased by a chamber forming shell that extends circumferentially around the shank. The chamber is filled with a ballast material in the form of a liquid having a specific gravity greater than that of water. A core may be formed about the shank between the shank and the body forming shell. Various colorings, materials, tints and impregnations may be employed so that the lure simulates the exoskeleton and internal structure of an organism. The shell is preferably a vinyl tube wrapped around the shank from one end to the other to lend a segmented appearance to the shell.

20 Claims, 2 Drawing Sheets

FISHING LURE

FIELD OF THE INVENTION

The present invention is generally directed to the field of artificial fishing lures and is specifically directed to artificial lures of the type commonly used in the popular sport of fly fishing. As such, the present invention is particularly directed to a fishing lure that is constructed to appear and perform as a natural food source appealing to fish. Such items of food include, but are not limited to, insects, worms, larva, and other organisms which occur in the natural habitat of fish and provide a food source.

BACKGROUND OF THE INVENTION

Humankind has long relied upon the art of fishing as a source of food, as evidenced by earliest recorded history and even artifacts predating recorded history. While some peoples to this day rely on fishing for survival, the bulk of the fishing industry has developed into both large-scale, commercial operations in fresh and salt water environments and domestic farming operations in controlled aquatic environments.

Separate from these fishing activities directed toward providing food for human consumption, fishing is enjoyed as an active sport by literally millions of people. Sport fishing may conveniently be divided into two types—bait fishing and artifical lure fishing. Artifical lure fishing may, in turn, be separated into two types. A first type of lure fishing employs a relatively heavy lure attached to a fish line, and the lure is advanced across the surface of the water or through the water below the surface, either by trolling or by spin-casting the lure and thereafter retrieving the lure. A second type of artificial lure fishing, called fly fishing, employs a relatively light artificial lure or "fly" and a light monofilament line with which the fly is flipped onto the surface of the water so that it may float on the surface ("dry fly") or become submerged ("wet fly"). In some cirumstances, the fly is advanced across or through the water to entice fish to strike the lure thereby becoming caught.

In fly fishing, one of the biggest challenges is presenting an artificial lure to the target fish that simulates a natural food source for the fish. In many instances, the favored food source of the fish will vary from day-to-day and, certainly, from season-to-season, primarily as a function of the naturally occurring organisms available as a diet for the fish. Naturally, the more realistic the artificial fly appears, the more likely success will follow. For this reason, a wide variety of artificial flies have been developed to simulate a broad spectrum of fish food items.

Fly fishing as a sporting enterprise first began to reach significant proportions in the early 1800's. In these early days, artifical flies were constructed out of horse hair, silk, chicken feathers, and other available items. Metal weights have been used to overcome the buoyancy of the fly. However, the techniques of tying flies, with a few exceptions, did not significantly change from the early 1800's. Rather, the primary improvement in artificial flies resided in the development of a wide variety of fly-constructing materials. One such improvement in fly-tying technique occurred with the invention of a fly-tying/braiding technique which has been referred to as the "Potts weave" which is described in U.S. Pat. No. 1,949,582 issued 6 Mar. 1934 to Francis Potts.

Even with the advancements in construction materials and the concomitant increase in the variety of flies, many flies still do not perform in a natural manner and may perform poorly in actual use. The need for natural appearance is readily understood by those versed in this art as many fish uncannily distinguish between an artificial lure and real food supply from small deviations in operational behavior. Further, once a fish takes the lure, the lure should feel similar to the actual food item it simulates. Therefore, there remains a need for improved artificial lures that more closely resemble both the appearance, action and texture of an item of food attractive to a fish.

SUMMARY OF THE INVENTION

It is an object of the present invention to provide a new and useful artificial lure which more closely simulates the action of such food in a water environment.

It is a further object of the present invention to provide an artificial lure that more closely resembles the appearance of an item of food for fish, such as an insect, larva, worm, or other organism.

Another object of the present invention is to provide an artificial lure which has a more realistic action both on the surface of the water and as the lure penetrates through the surface of the water.

A still further object of the present invention is to provide an artificial lure that is more realistic in texture so that a fish is more likely to retain the lure in its mouth for a longer period of time.

The present invention, then, is directed to artificial lures in general, and specifically to an artificial fly that realistically simulates, in appearance, action and texture, a natural food item occurring in the aquatic environment of the fish. In its broad form, the fishing lure comprises a fishing hook that is formed to have a shank, a hook portion at a first end of the shank opposite the first end; the eye portion is operative to permit attachment of length of fishing line thereto. A shell structure is positioned about a portion of the shank in order to form a chamber therearound, and this chamber has an interior adapted to receive a ballast material. The ballast material preferably has a specific gravity within a range of 1.1 to 1.6, inclusive, and preferably is a liquid material such as oil, glycerin, or physically equivalent substance, and may be vegetable oil. The chamber in the shell structure is closed in any convenient manner in order to retain the ballast material therein. Preferably, the shell is formed by an elongated piece of flexible tubing having an interior passageway. The tubing is wrapped circumferentially around a portion of the shank to define an outer body forming an external skin around the shank with this skin simulating the exoskeleton of an insect and the passageway forming the ballast chamber.

While this tubing may be opaque, it is preferred that this tubing be transmissive to visual light and be slightly resilient. The wrapping of the tube thus presents an outer body that has a segmented appearance. Further, core material may be positioned between the shank and the outer shell in order to simulate the internal structure of an insect. This core material may be selected from a group consisting of thread, reflective foil, plastic material, pearlescent material, furs and feathers. The ballast liquid may be translucent, tinted or phosphorescent, or if desired, the outer shell material may be either tinted or phosphorescent. Other appearance simulating structure, such as feathers, beards and the like, may be implemented to simulate the head, thorax and abdomen portions of the insect. The outer skin may also be impregnated with an odoriferous material attractive to a fish.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to the construction of artificial lure useful in sports fishing and specifically toward a new and useful construction of and artifical "fly." While the preferred embodiment of the present invention is thus discussed with respect to an artificial fly, it should be understood and appreciated by the ordinarily skilled person in the art that the present invention has applications for standard-type lures, as well. It is the purpose of the present invention to create an artificial fishing lure that has the appearance of an item of food attractive to a fish, that more closely mimics a real organism upon which fish prey and that has a more natural texture. Furthermore, it should be understood that present invention has been described with respect to one appearance of a fly, the technique and inventive concepts contained in this invention may be implemented in other fly constructions, as well.

Figure 1:
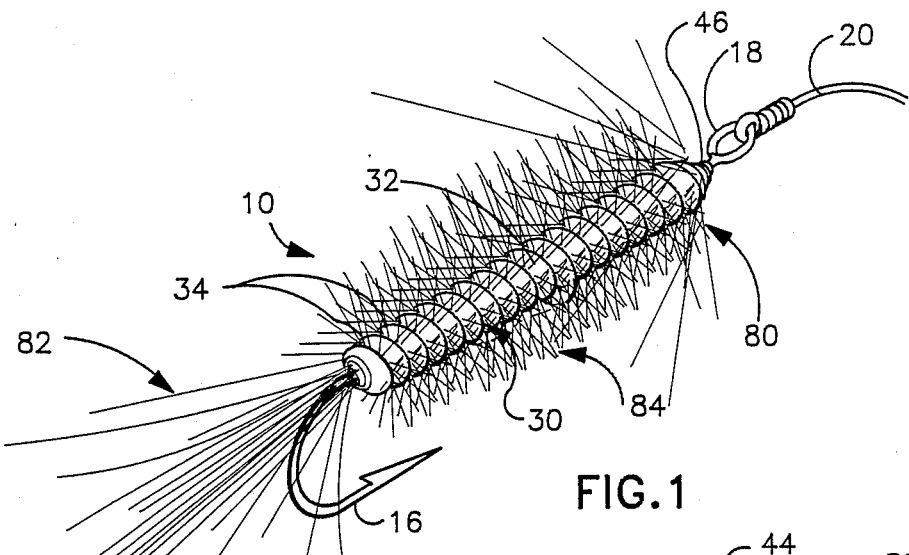
FIG. 1 is a perspective view of a representative artificial lure, in the form of a fly, according to the preferred embodiment of the present invention as attached to a fishing line.
Figure 2:
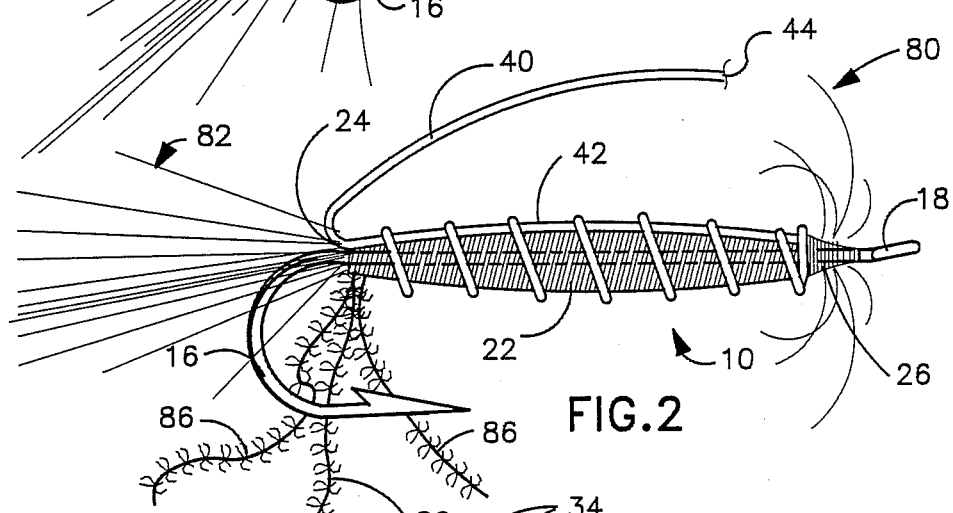
FIG. 2 is a side view in elevation of a first intermediate stage in the assembly of the fly shown in FIG. 1.
Figure 3:
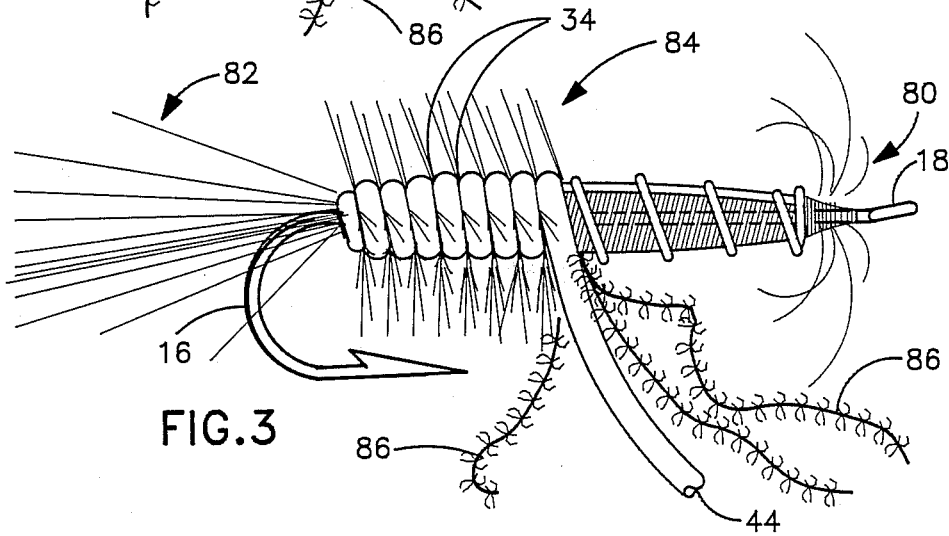
FIG. 3 is a side view in elevation of a second intermediate step in the formation of the fly in FIG. 1 and 2.

The preferred embodiment of the present invention is shown in FIGS. 1-4. In these figures, an artificial fishing lure, in the form of fly 10 is shown both in its completed form, in FIGS. 1 and 4, and in intermediate production steps, as is shown in FIGS. 2 and 3. In these figures, then, it may be seen that a fly 10 is formed of a fish hook 12 which has a shank 14, a hook portion 16 located at one end of the shank and an eye portion 18 located at a second end of shank 14 opposite the first end; eye portion 18 is operative to permit attachment of a length of fishing line 20. Fly 10 has a body 30 which is in the form of shell-like structure having an outer surface that defines an external skin 32 which, in the embodiment shown in FIGS. 1-4, has a segmented appearance which simulates the exoskeleton of an insect having a plurality of segments, such as segments 34. Body 30 extends about a portion of the shank and, as described below, forms a chamber around the shank portion. Additional appearance-simulating structure may also be provided, depending upon the type of appearance desired for the fly, with these additional structures including a uropod or beard 80, a tail 82 and body hair 84. Naturally, the ordinarily skilled fly tier will recognize that a variety of body structure may be provided to simulate the appearance of an insect or other living organism in order to represent the head, thoratic region and abdomen, and tail of the insect. Beard 80, tail 82 and body hair 84 may be formed of natural and synthetic threads, fur, feathers, and the like, as is known in the art.

Turnig to FIG. 2, it may be seen that the construction of fly 10 is accomplished by first wrapping or otherwise encasing the shank portion of hook 12 with a material such as thread, reflective foil, plastic material, pearlescent material, fur and/or feathers to form a core 22. Where, as in FIG. 2, core 22 is a thread core, it may be tied off at either end, by means of tie off threads 24 and 26. As is shown in FIG. 2, threads 24 secure the strands which form tail 82 and also secure feather strands 86 which will be used to form the body hair 84. An elongated piece of flexible vinyl tube 40 is secured at a first end portion 42 alongside core 22 by means of a monofilament line 28 wrapped circumferentially around core 22 and first end portion 42, as is best shown in FIG. 2.

After creating the first intermediate assembly of fly 10, as is shown in FIG. 2, the fly is completed by weaving or braiding feather strands 86 with flexible tube 40 so that flexible tubing 40 is wrapped circumferentially around shank 14 and core 22 to define body 30 and tying end 44 of tube 40 adjacent eye portion 18. Preferably, flexible tube 40 and feather strands 80 are braided according to the Potts Weave developed by Francis Potts. While the skilled fly-tier will recognize that other methods of producing body 30 are possible and are within the scope of the invention, the use of the Potts Weave allows for a tight innerlocked structure such that body hair 84 may be pulled out of the narrow space adjacent segments 34. When the wrapping and weavig of tube 40 and feather strands 86 is completed, they are tied off by threads 46 adjacent eye portion 18.

Figure 4:
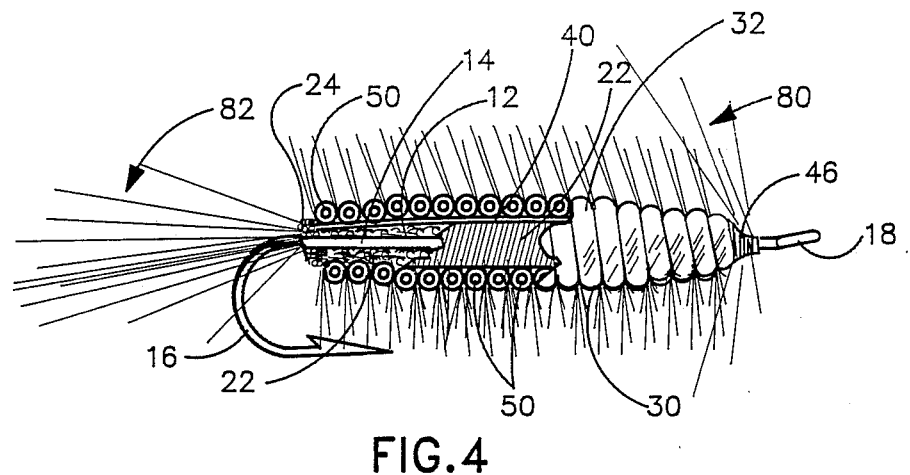
FIG. 4 is a side view partially broken away in cross section showing the completed lure of FIG. 1.

The completed structure of fly 10, as noted, is best-shown in FIGS. 1 and 4. With specific reference to FIG. 4, further and important structure of the present invention may now be more readily understood. In that figure, it may be seen that flexible tube 40 has an interior passageway or chamber 50 forming an open interior for tube 40. Chamber 50 thus spirals circumferentially around core 22 along the shank 14 of hook 12. Chamber 50 is filled with a ballast material, preferably in the form of a liquid having a viscosity in the range of 1.1 to 1.6, inclusive. This liquid ballast may be such materials as oil, glycerin, or physically equivalent materials, and in the preferred embodiment, the ballast material is vegetable oil. To provide for expansion and resiliency, it is sometimes helpful to only partially fill chamber 50 with fluid. Preferably, elongated tube 40 is a transparent vinyl tubing but can be other tubing material as desired.

From the foregoing description, it should be appreciated that skin 32 is preferably light transmissive. Likewise, it is preferred that the liquid ballast be a light transmissive material which, if desired, can either be tinted or contain a phosphorescent material. If desired, tube 40 may also be tinted with a selected material and may itself be impregnated with a phosphorescent material or with an odoriferous material attractive to a fish.

With this construction, also, it should be appreciated that the core material is selected from a group consisting of natural and synthetic threads, reflective foil, plastic material, pearlescent material, furs and feathers. To this end, the core which is somewhat visible through skin 32 simulates the appearance of the internal structure of an insect or other living organism while the skin 32 simulates the exoskeleton of an insect or other living organism. It is also important to realize that it is necessary to seal tube 40 at each end 42 and 44 to retain the ballast liquid therein. This can simply be accomplished by heat sealing each end or, if desired, ends 42 and 44 can be mechanically sealed during the tying off process of the fly formation.

In use, fly 10 exhibits realistic properties simulating a food organism that is attractive to a fish. The present fly exhibits advantages over existing fly structures in that the liquid ballast material causes the fly to penetrate the surface of water quicker and provides neutral buoyancy for the fly very similar to an insect or other living organism. Furthermore, by providing the body 30 with a translucent appearance, there is a pronunciation between the body core and the artificial exoskeleton providing a halo effect due to the partial reflection and refraction of light passing therethrough similar to an actual living organism. Further, the vinyl tubing 40 is somewhat resilient and, with the liquid ballast material, provides a more natural feel and texture to the lure so that, when a fish bites the lure, the fish is more inclined to keep the fly in its mouth before rejecting it. This allows the fly fisherman to set the hook before the fish realizes that the fly is an artificial item and not a natural food.

Figure 5:
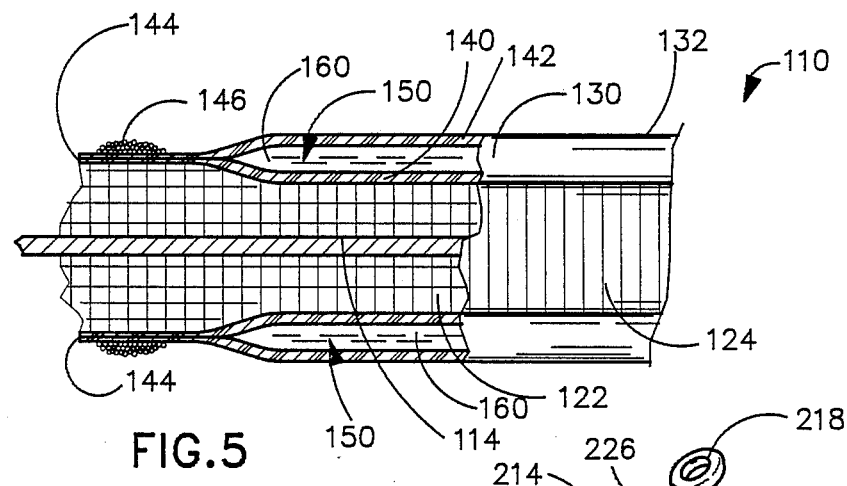
FIG. 5 is a cross sectional view of a shank portion of a first alternate embodiment of the present invention.

Even though it is preferred to provide chamber 50 with a hollow tubing, such as vinyl tube 40, it is also possible to provide other embodiments of present invention to create a shell around the fish hook. For example, FIG. 5 shows a shank portion 114 of an alternate lure or fly 110 wherein core 122 is here formed by wrapping a plurality of layers of a foil strip 124 around shank portion 114. Body portion 130 is formed by a pair of concentric sleeves 140 and 142 which create an annular chamber 150 therein. Tubular sleeves 140 and 142 are concentric and are sealed together, for example at end 144. Chamber 150 then receives the ballast fluid 160. Body 130, formed by sleeves 140 and 142, is telescopically received over core 122 and is secured, for example, by threads 146. As is shown in FIG. 5, strip 124 provides a segmented appearance to fly 121 which is visible through transparent outer skin 132 of fly 110. Tubing 140 and 142 is somewhat resilient so that, along with liquid 160, impart a natural feel and texture to lure 110.

Figure 6:
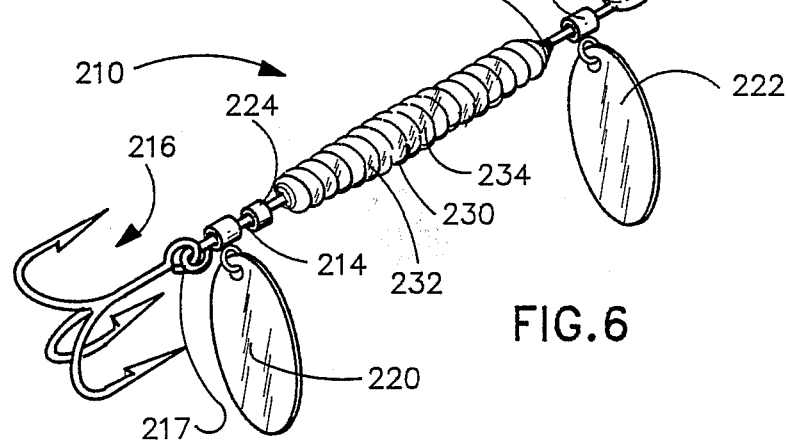
FIG. 6 is a perspective view of a second alternate embodiment of the present invention in the form of a true lure.

A second alternate embodiment of the present invention is shown in FIG. 6 and is in the form of a more traditional lure 210 which has a hook portion 216 pivotally mounted by mount 217 at one end of a shank 214 that forms a central portion of lure 210. An eye portion 218 is located opposite hook portion 216 and is adapted to attach a fishing line. A pair of spinner spoons 220 and 222 are respectively located adjacent hook portion 216 and eye portion 218 and are mounted on spinner sleeves 224 and 226, respectively. Body 230 is then formed by a circumferentially wrapped tube along shank 214, in the manner substantially the same as that described with respect to FIGS. 1-4. Body portion 230 has an exterior skin 232 that gives the appearance of the exoskeleton of a living organism and a core 234 may be positioned between body 230 and shank 214 with core 234 being visible through transparent skin 232. The construction of body 230 and core 234 may be similar to that shown with respect to the preceding embodiments.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departig from the inventive concepts contained herein.

I claim:

1. A fishing lure having the appearance of an item of food attractive to a fish, comprising:
   a fish hook including a shank, a hook portion at a fist end of the shank and an eye portion at a second end of the shank opposite the first end and operative to permit attachment of a length of fishing line;
   shell means positioned about a portion of the shank for forming a chamber around said portion of the shank, said shell means having an interior and defining external light transmissive skin around said shank that simulates the exoskeleton of an insect;
   a ballast material in the interior of the chamber;
   means for closing said chamber to retain said ballast material therein; and,
   a core material positioned between said shank and said shell means, said core material simulating the internal structure of an insect.

2. A fishing lure according to claim 1 wherein said core material is selected from a group consisting of: natural thread, synthetic thread, reflective foil, plastic material, pearlescent material, fur and feather.

3. A fishing lure according to claim 2 wherein said liquid is translucent.

4. A fishing lure accordig to claim 2 wherein said liquid is tinted with a selected color.

5. A fishing lure according to claim 2 wherein said liquid is phosphorescent.

6. A fishing lure according to claim 1 wherein said ballast material includes a liquid.

7. A fishing lure according to claim 6 wherein said liquid is selected from a group consisting of: oil and glycerin.

8. A fishing lure according to claim 1 wherein said ballast material has a specific gravity within a range of 1.1 to 1.6, inclusive.

9. A fishing lure having the appearance of an item of food attractive to a fish, comprising:
   a fish hook including a shank, hook portion at a first end of the shank and an eye portion at a second end of the shank and opposite the first end operative to permit attachment of a length of fishing line;
   an elongated piece of flexible tube having an interior passageway, a first tube end and second tube end, said tube wrapped circumferentially around a portion of said shank to define an outer body with said passageway defining a chamber around said shank;
   a liquid ballast material contained within the interior passageway; and
   means for closing said first and second tube ends to retain said ballast material therein.

10. A fishing lure according to claim 9 wherein said ballast material is vegetable oil.

11. A fishing lure according to claim 10 wherein said tube is transmissive to visible light and forms an outer skin simulating the exoskeleton of an organism.

12. A fishing lure according to claim 11 including a core material surrounding the shank and located between the outer body and the portion of the shank about which the tube is wrapped to define an inner body simulating the internal structure of an organism.

13. A fishing lure accordig to claim 12 wherein said tube is tinted with a selected color.

14. A fishing lure according to claim 13 wherein one of said tube, said core material, and said liquid contains a phosphorescent material.

15. A fishing lure according to claim 11 wherein said liquid is tinted with a selected color.

16. A fishing lure according to claim 9 wherein said tube is wrapped such that said outer body has a segmented appearance.

17. A fishing lure according to claim 16 including means for simulating head, thorax and abdomen portions of an insect.

18. A fishing lure according to claim 9 wherein said tube is impregnated with an odoriferous material attractive to fish.

19. A fishing lure according to claim 9 wherein said ballast material has a specific gravity in a range of 1.1 to 1.6, inclusive.

20. A fishing lure having the appearance of an item of food attractive to a fish, comprising:
- a fish hook including a shank, a hook portion at a first end of the shank and an eye portion at a second end of the shank opposite the first end and operative to permit attachment of a length of fishing line:
- shell means positioned about a portion of the shank for forming a chamber around said portion of the shank, said shell means having an interior and defining an external light transmissive skin around said shank that simulates the exoskeleton of an insect:
- a ballast material, including a liquid, in the interior of the chamber; and
- means for closing said chamber to retain said ballast material therein.

* * * * *